(12) United States Patent
Singh et al.

(10) Patent No.: US 7,182,519 B2
(45) Date of Patent: Feb. 27, 2007

(54) METHODS AND APPARATUS FOR ASSEMBLING A BEARING ASSEMBLY

(75) Inventors: Anant Pal Singh, Cincinnati, OH (US); Larry Jay Sexton, Mason, OH (US)

(73) Assignee: General Electric Company, Schenectady, NY (US)

( * ) Notice: Subject to any disclaimer, the term of this patent is extended or adjusted under 35 U.S.C. 154(b) by 104 days.

(21) Appl. No.: 10/876,084

(22) Filed: Jun. 24, 2004

(65) Prior Publication Data

US 2005/0286823 A1 Dec. 29, 2005

(51) Int. Cl.
*F16C 19/06* (2006.01)
(52) U.S. Cl. ..................................... 384/448
(58) Field of Classification Search ............... 384/448, 384/609, 618; 324/173, 174
See application file for complete search history.

(56) References Cited

U.S. PATENT DOCUMENTS

| | | | |
|---|---|---|---|
| 4,478,082 A | 10/1984 | Sato et al. | |
| 5,072,611 A | 12/1991 | Budd et al. | |
| 6,363,303 B1 | 3/2002 | Bertness | |
| 6,439,767 B1 | 8/2002 | Badeer | |
| 6,484,582 B2* | 11/2002 | Ehrfeld et al. | 384/448 |
| 6,637,932 B2 | 10/2003 | Badeer | |

FOREIGN PATENT DOCUMENTS

| | | |
|---|---|---|
| DE | 3150368 A1 | 12/1981 |
| DE | 4020119 A1 | 2/1991 |
| EP | 1148261 A2 | 10/2001 |

OTHER PUBLICATIONS

Munich Search Report; Reference No. 151003/10644; Application No./ Patent No. 05252439.4—2315 PCT/; Dated Oct. 21, 2005; 3 pgs.

* cited by examiner

*Primary Examiner*—Lenard A. Footland
(74) *Attorney, Agent, or Firm*—William Scott Andes; Armstrong Teasdale LLP (57) ABSTRACT

A method for predicting bearing failure, wherein the bearing includes an inner race, an outer race, and a plurality of rolling elements between the inner and outer race. The method includes coupling a sensor assembly to the outer race, the sensor assembly including at least one temperature sensor and at least one acoustic sensor, generating a bearing performance model based on an initial signal received from the sensor assembly, receiving a second signal from the sensor assembly, and comparing the second signal to the bearing performance model to predict a bearing failure.

12 Claims, 7 Drawing Sheets

METHODS AND APPARATUS FOR ASSEMBLING A BEARING ASSEMBLY

STATEMENT REGARDING FEDERALLY SPONSORED RESEARCH OR DEVELOPMENT

The U.S. Government may have certain rights in this invention pursuant to contract number HR001-04-C-0002.

BACKGROUND OF THE INVENTION

This application relates generally to gas turbine engine rotor assemblies, and more particularly, to bearing assemblies used with gas turbine engine rotor assemblies.

Gas turbine engines typically include a fan rotor assembly, a compressor, and a turbine. The turbine includes an array of rotor blades extending radially outward from rotor disk that is coupled to a rotor shaft. The rotor shaft transfers power and rotary motion from the turbine to the compressor, and is supported longitudinally through a plurality of roller bearing assemblies and axially through at least one thrust bearing assembly. Known roller bearing assemblies include rolling elements supported within a paired race.

During operation, failure of a bearing assembly may result in an In Flight Shut Down (IFSD), and/or an Unscheduled Engine Removal (UER). At least one known gas turbine engine includes a magnetic chip detection system that includes a magnet that attracts metal shavings created during bearing contact fatigue failures such as, but not limited to micro-spalling, peeling, skidding, indentations, and/or smearing. More specifically, magnetic chip detectors facilitate identifying the presence and the quantities of metallic chips in a gas turbine lube oil scavenge line. In addition, a scanning electron microscope (SEM) may be used to determine the source of the metal shavings. However, known magnetic chip detection systems and SEM analysis systems can only detect a bearing spalling that has already occurred.

At least one known gas turbine engine also includes a vibration measurement system that transmits relatively high frequency acoustic emissions through the bearing to verify a bearing failure caused by bearing contact fatigue has occurred. However, known vibration measurement systems may not be able to successfully identify the bearing failure if the transmitted signal is degraded when passed through a lubricant film that is used to lubricate the bearing. Accordingly, identifying the bearing component frequencies among a plurality of engine operating frequencies may be relatively difficult. Accordingly, known systems are generally not effective in detecting initial bearing flaws and/or defects that may result in bearing spalling, in monitoring bearing damage and/or spall propagation, or in assessing the overall bearing damage including multi-spall initiations and progression.

BRIEF DESCRIPTION OF THE INVENTION

In one aspect method for predicting bearing failure, wherein the bearing includes an inner race, an outer race, and a plurality of rolling elements between the inner and outer race is provided. The method includes coupling a sensor assembly to the outer race, the sensor assembly including at least one temperature sensor and at least one acoustic sensor, generating a bearing performance model based on an initial signal received from the sensor assembly, receiving a second signal from the sensor assembly, and comparing the second signal to the bearing performance model to predict a bearing failure.

In another aspect, a bearing assembly for a rotor is provided. The bearing assembly includes an inner race, an outer race, a plurality of rolling elements between the inner and outer race, and a sensor assembly coupled to the outer race, the sensor assembly comprising at least one temperature sensor and at least one acoustic sensor.

In a further aspect, a gas turbine engine is provided. The gas turbine engine includes a rotor shaft, and a bearing assembly configured to support the rotor shaft. The bearing assembly includes an inner race, an outer race, a plurality of rolling elements between the inner and outer race, and a plurality of sensor assemblies coupled to the outer race, each the sensor assembly comprising at least one temperature sensor and at least one acoustic sensor.

DETAILED DESCRIPTION OF THE INVENTION

Figure 1:
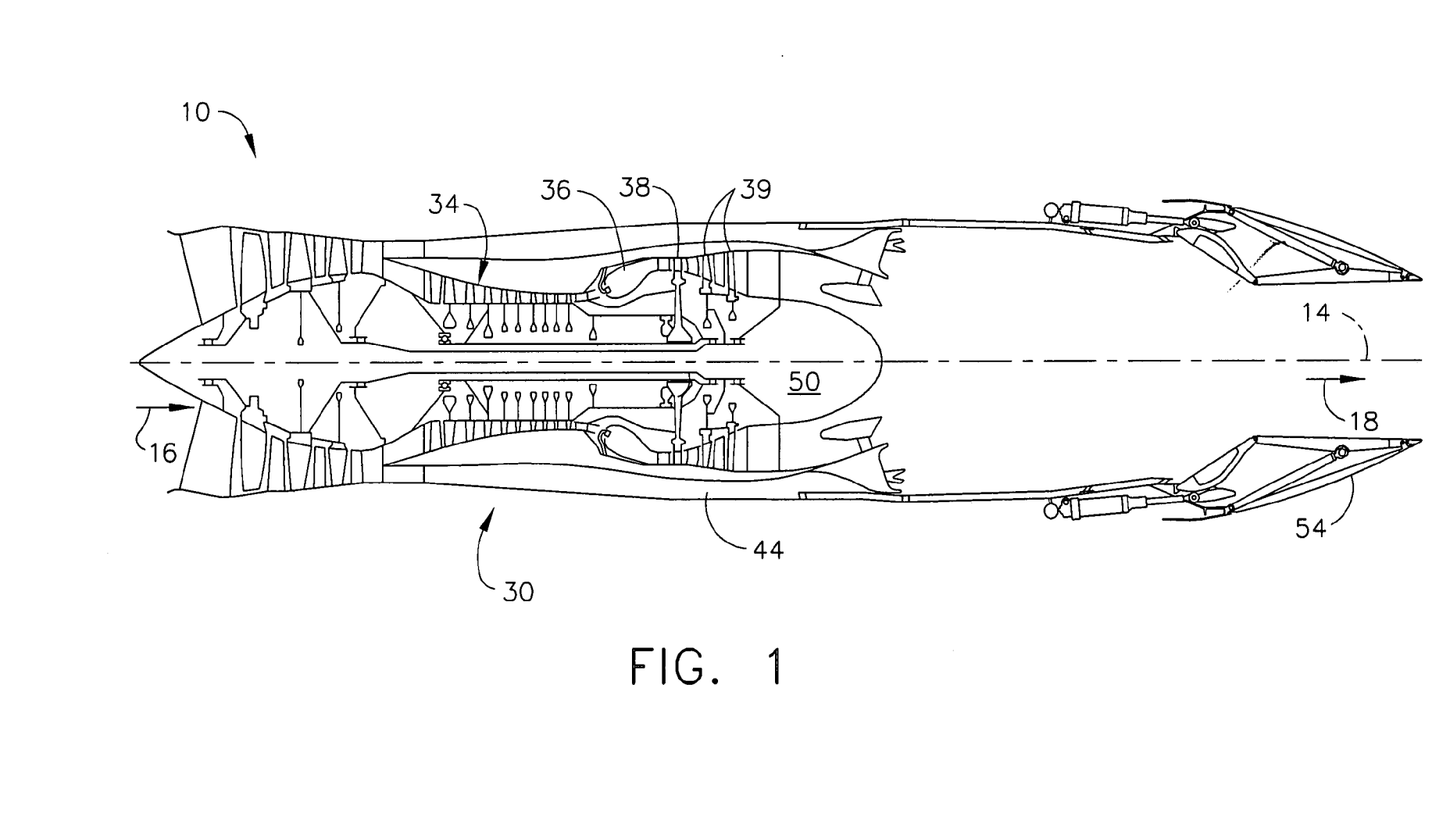
FIG. 1 is schematic illustration of a gas turbine engine.

FIG. 1 is a cross-sectional side view of an exemplary gas turbine engine 10. In one embodiment, gas turbine engine 10 is an F110 engine available from General Electric Aircraft Engines, Cincinnati, Ohio. Engine 10 has a generally longitudinally extending axis or centerline 14 extending in a forward direction 16 and an aft direction 18. Engine 10 includes a core engine 30 which includes a high pressure compressor 34, a combustor 36, a high pressure turbine 38, and a power turbine or a low pressure turbine 39 all arranged in a serial, axial flow relationship. In an alternative embodiment, core engine 30 includes a compressor, a detonation chamber, and a turbine arranged in a serial, axial flow relationship. Engine 10 also includes a bypass duct 44 that surrounds core engine 30, and enables fluid flow to be routed downstream from core engine 30 rather than through core engine 30. In an alternative embodiment, engine 10 includes a core fan assembly (not shown). An annular centerbody 50 extends downstream from core engine 30 toward a variable geometry exhaust nozzle 54.

During operation, airflow enters engine 10 and fuel is introduced to core engine 30. The air and fuel are mixed and ignited within core engine 30 to generate hot combustion gases. Specifically, pressurized air from high pressure compressor 34 is mixed with fuel in combustor 36 and ignited, thereby generating combustion gases. Such combustion gases drive high pressure turbine 38 which drives high pressure compressor 34. The combustion gases are discharged from high pressure turbine 38 into low pressure turbine 39. The core airflow is discharged from low pressure turbine 39 and directed aftward towards exhaust nozzle 54.

Figure 2:
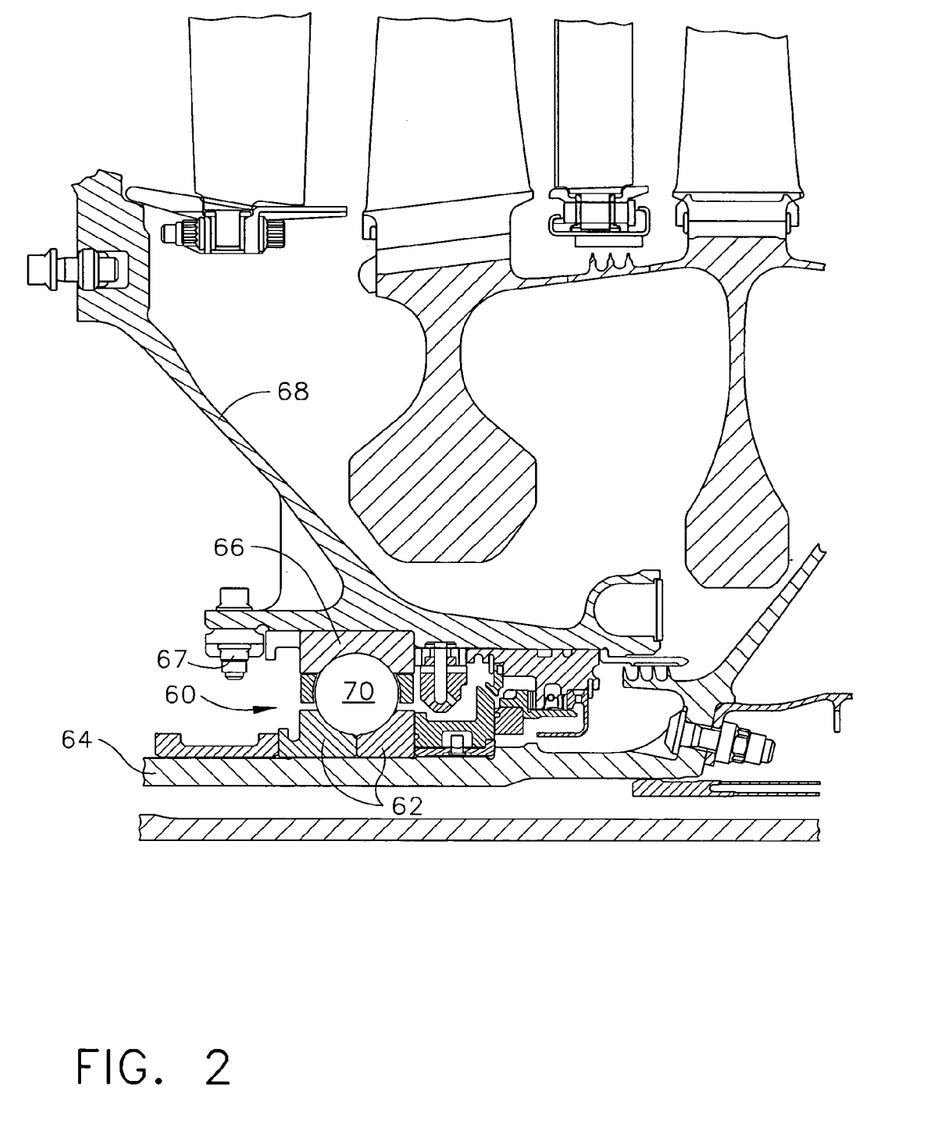
FIG. 2 is a cross-sectional view of an exemplary embodiment of a thrust bearing assembly that may be used in the gas turbine engine shown in FIG. 1.

FIG. 2 is a cross-sectional view of an exemplary embodiment of a thrust bearing assembly 60 that may be used with a gas turbine engine, such as engine 10 shown in FIG. 1. In the exemplary embodiment, thrust bearing assembly 60 is high pressure turbine thrust bearing assembly (38). Thrust bearing assembly 60 includes a rotating inner race 62 secured to a rotor shaft 64 that extends between high pressure turbine 38 and high pressure compressor 34. Thrust bearing assembly 60 also includes a stationary outer race 66 secured to a stationary support structure 68 of gas turbine engine 10, and a plurality of bearings 70 positioned between inner and outer races 62 and 66 respectively. In the exemplary embodiment, bearings 70 are ball bearings.

Figure 3:
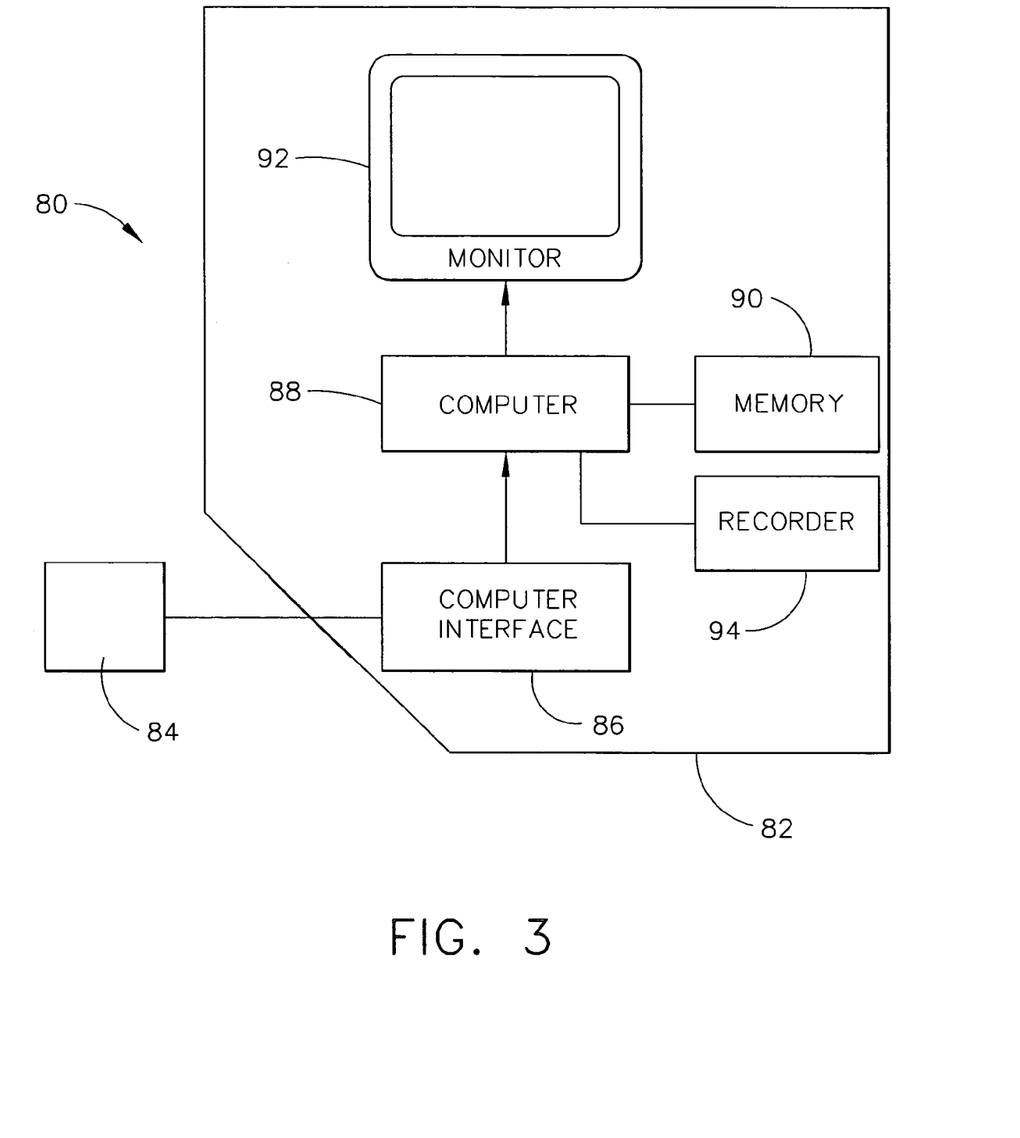
FIG. 3 is a bearing monitoring system that may be used to monitor the thrust bearing shown in FIG. 2.

FIG. 3 is a bearing monitoring system 80 that may be used to monitor a gas turbine engine bearing such as, but not limited to, thrust bearing assembly 60 (shown in FIG. 2). In the exemplary embodiment, bearing monitoring system 80 includes a data acquisition/control system 82 that is coupled to a sensor assembly 84. Sensor assembly 84 is electrically coupled to data acquisition/control system 82 such that data collected from thrust bearing assembly 60 can be transmitted to/from sensor assembly 84 and data acquisition/control system 82. Data acquisition/control system 82 includes a computer interface 86, a computer 88, such as a personal computer, a memory 90, and a monitor 92. Computer 88 executes instructions stored in firmware (not shown). Computer 88 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

Bearing monitoring system 80 is intended to represent one or more volatile and/or nonvolatile storage facilities not shown separately that are familiar to those skilled in the art. Examples of such storage facilities often used with computer 88 include solid state memory (e.g., random access memory (RAM), read-only memory (ROM), and flash memory), magnetic storage devices (e.g., floppy disks and hard disks), optical storage devices (e.g., CD-ROM, CD-RW, and DVD), and so forth. Memory 90 may be internal to or external to computer 88. In the exemplary embodiment, data acquisition/control system 82 also includes a recording device 94 such as, but not limited to, a strip chart recorder, a C-scan, and an electronic recorder, electrically coupled to at least one of computer 88 and sensor assembly 84.

Figure 4:
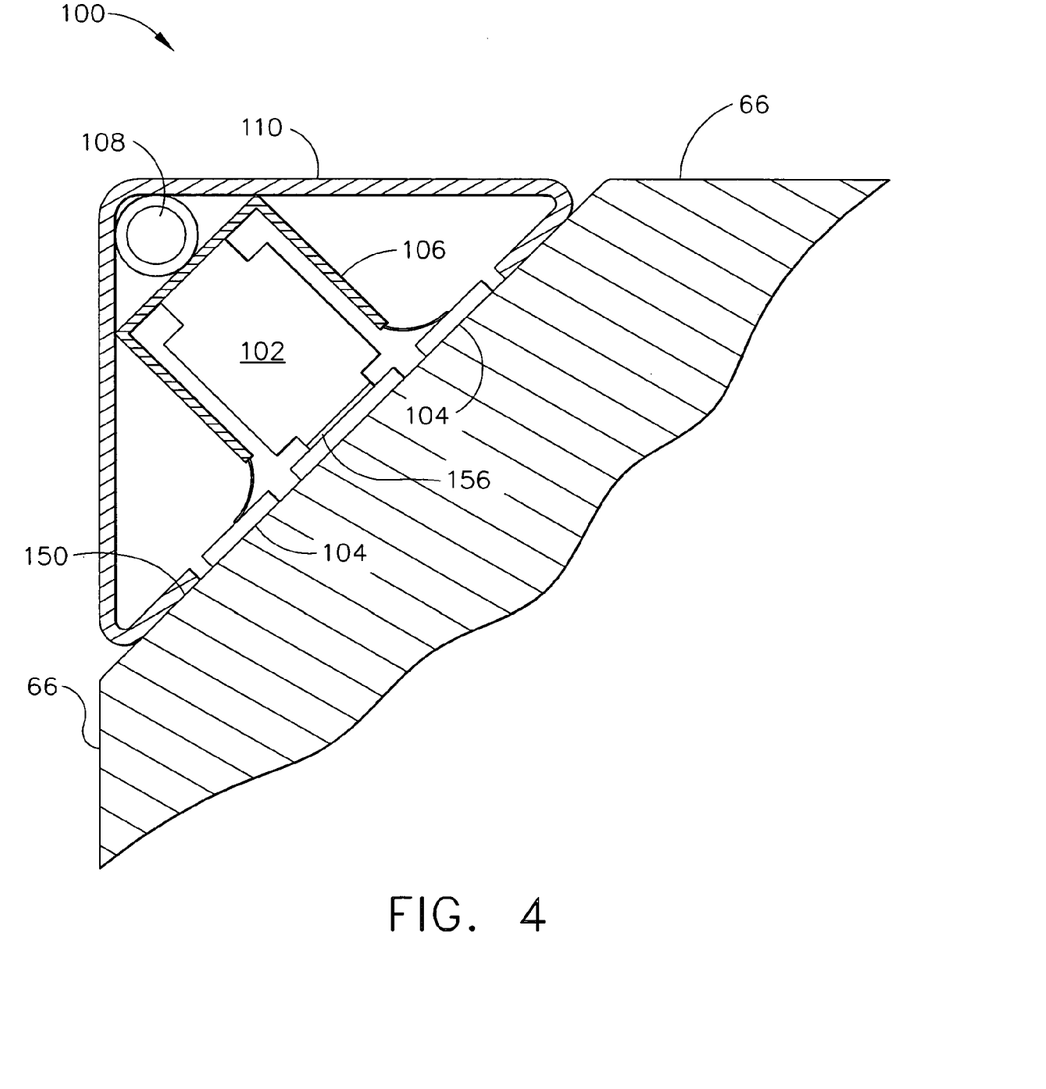
FIG. 4 is cross-sectional view of an exemplary sensor assembly that can be used with the bearing monitoring system shown in FIG. 3.

FIG. 4 is cross-sectional view of an exemplary sensor assembly 100 that can be used with bearing monitoring system 80 (shown in FIG. 3). Sensor assembly 100 includes at least one acoustic emission microphone sensor 102 and at least one thermocouple 104 and/or resistance temperature detector (RTD) 104. In one embodiment, RTDs 104 are at least one of wire windings or thin film type serpentines that generate changes in resistance based on changes in a temperature of thrust bearing assembly 60. Additionally, RTDs 104 have increased relative sensitivity, linearity, and stability when compared to thermocouples 104. In the exemplary embodiment, sensor assembly 100 includes one acoustic emission microphone sensor 102 and two thermocouples 104. Sensor assembly 100 also includes a first housing 106 to facilitate securing acoustic emission microphone sensor 102 in a relatively fixed position with respect to a bearing outer race (shown in FIG. 5). Sensor assembly 100 also includes a wiring harness 108 to facilitate electrically coupling acoustic emission microphone sensor 102 and thermocouples 104 to a bearing monitoring system such as bearing monitoring system 80 (shown in FIG. 3). Sensor assembly 100 further includes a second housing 110 positioned radially outward from first housing 106.

Figure 5:
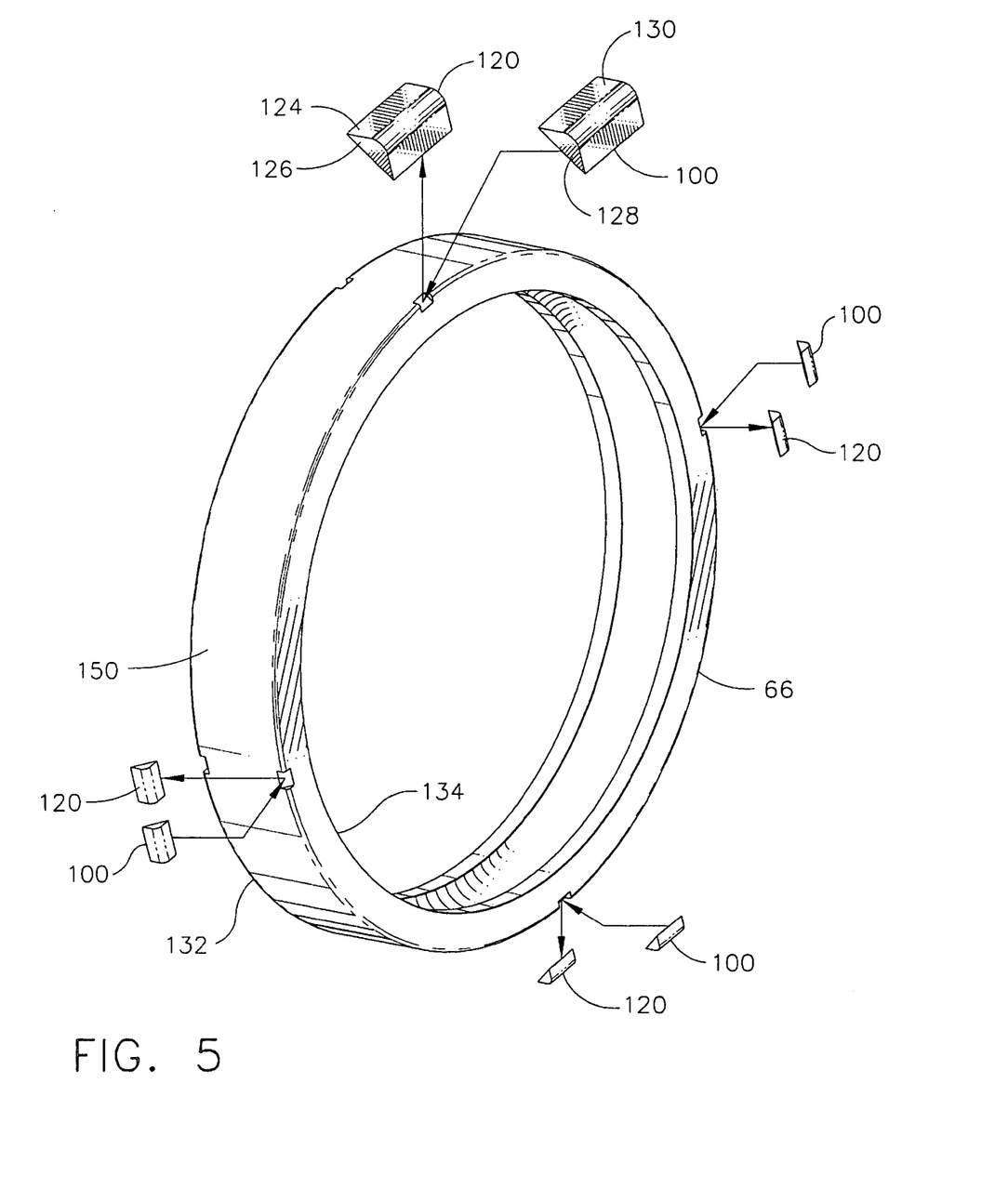
FIG. 5 is a perspective view of an outer race that may be used with the thrust bearing assembly shown in FIG. 2.
Figure 6:
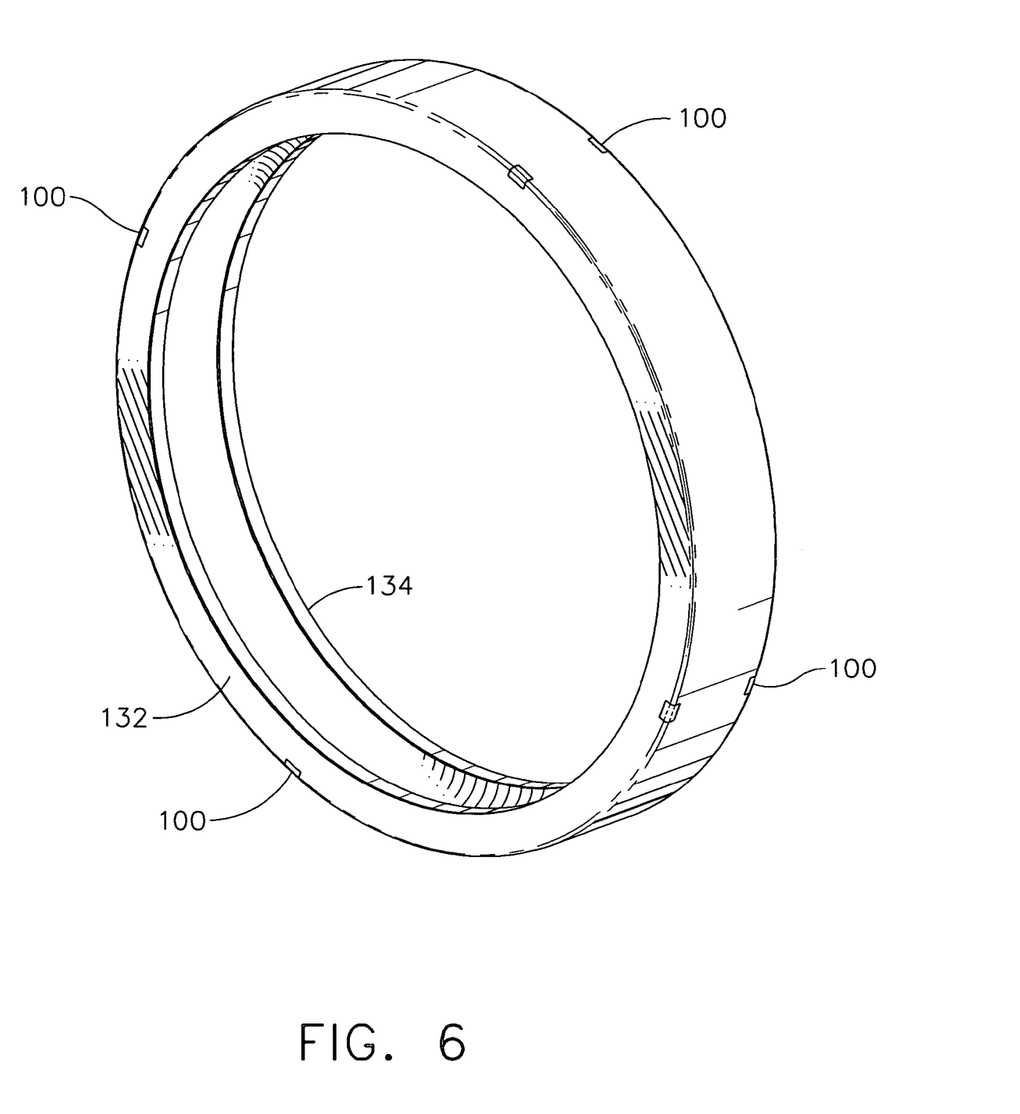
FIG. 6 is a perspective view of the outer race shown in FIG. 5.

FIG. 5 is a perspective view of a first side 132 of outer race 66. FIG. 6 is a perspective view of a second side 134 of outer race 66. In the exemplary embodiment, a plurality of sensor assemblies 100 are coupled to outer race 66 to facilitate predicting a failure of thrust bearing assembly 60. More specifically, outer race 66 is either fabricated or machined to remove a plurality of portions 120 from an exterior surface 150 of outer race 66. Each respective portion 120 includes an exterior surface 124 that has a cross-sectional profile 126, and each sensor assembly 100 has an exterior surface 128 that has a cross-sectional profile 130 that is substantially similar to cross-sectional profile 126. Accordingly, a plurality of sensor assemblies 100 can be coupled to outer race 66 without significantly altering outer race outer surface 150.

In the exemplary embodiment, outer race 66 includes approximately eight sensor assemblies 100. Four sensor assemblies 100 are coupled to first side 132 of outer race 66 and four sensor assemblies are coupled to second side 134 opposite first side 132. In the exemplary embodiment, each respective sensor assembly 100 is positioned approximately ninety degrees radially from each other respective sensor assembly 100 such that sensor assemblies 100 circumscribe each respective side 132, 134 of outer race 66.

Figure 7:
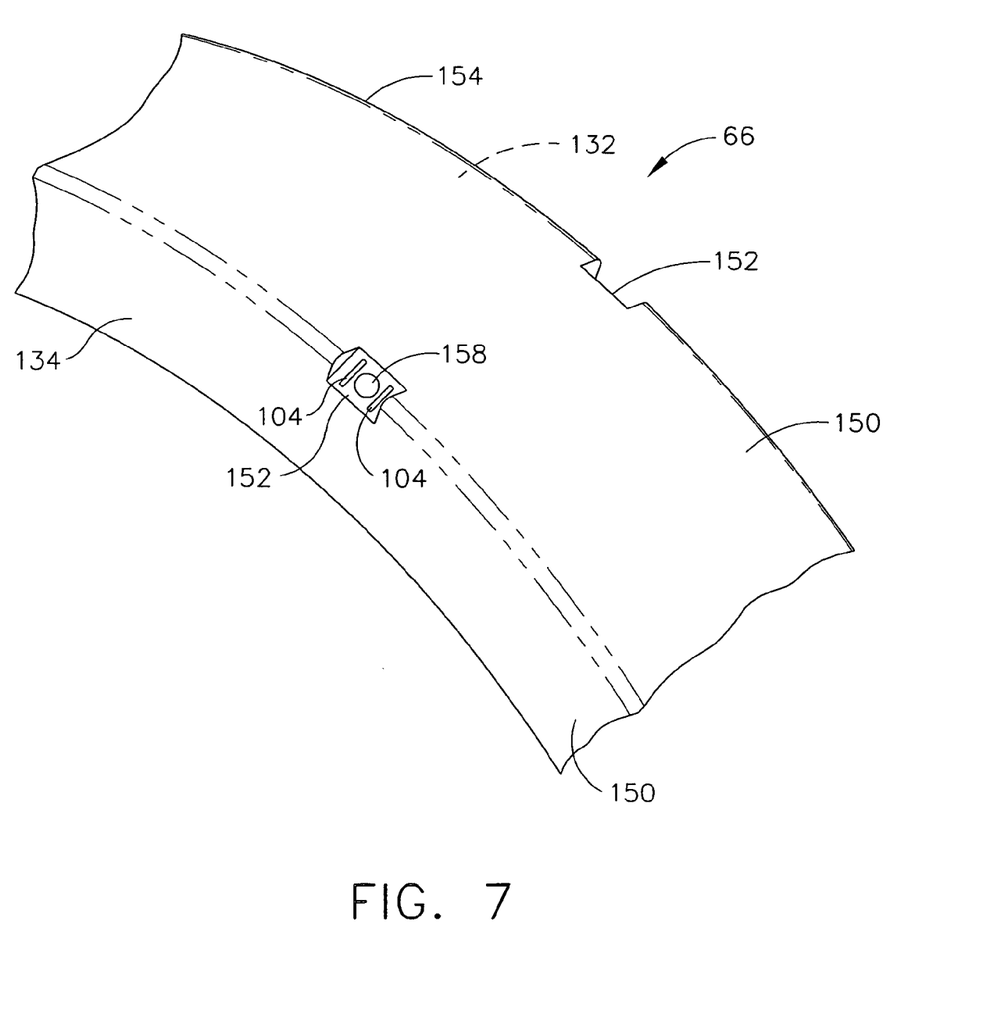
FIG. 7 is a perspective view of a portion of the outer race shown in FIGS. 5 and 6.

FIG. 7 is a perspective view of a portion of outer race 66. During assembly of thrust bearing assembly 60, outer race 66 is machined and/or fabricated such that portions 120 are removed from outer race outer surface 150 thereby revealing a plurality of substantially flat surfaces 152 to which each respective sensor assembly 100 is coupled. Additionally, outer race 66 is fabricated such that plurality of thermocouples 104 are imbedded within outer race 66. Wiring harness 108 is then electrically coupled to acoustic emission microphone sensors 102 and thermocouples 104.

More specifically, and in the exemplary embodiment, eight portions 120 are machined from outer race outer surface 150 such that eight sensor assemblies 100 are coupled to eight respective flat surfaces 152 that are circumferentially positioned around an outer periphery 154 of outer race 66. Each respective sensor assembly 100 includes at least one acoustic emission microphone sensor 102 and at least two thermocouples 104, imbedded within outer race 66, which are electrically coupled to wiring harness 108 and then to bearing monitoring system 80. A thin layer of lubricant 156 is added between each respective acoustic emission microphone sensor 102 and a pad 158 formed on each respective flat surface 152 to fill an air gap between acoustic emission microphone sensor 102 and flat surface 152, and to facilitate improving an acoustic performance of each respective acoustic emission microphone sensor 102. Sensor assembly 100 is then coupled to outer race 66. Since the acoustic emission sensors are non-contacting to the outer race, these will be securely mounted in the housing and the spanner nut 67. In the exemplary embodiment, outer race 66 is clamped by spanner nut 67 to facilitate reducing an axial movement of outer race 66 when thrust bearing assembly 60 is loaded in either a forward or aft direction.

During engine operation, resistance temperature detectors (RTDs) 104 facilitate measuring a temperature of outer race 66 at a plurality of substantially equally spaced circumferentially located positions around outer periphery 154 of outer race 66. In the exemplary embodiment, data collected from each respective sensor assembly 100 is compared to known bearing data using an algorithm, installed on computer 88 for example, to determine a resultant bearing load for thrust bearing assembly 60. More specifically, a temperature of outer race 66 is a function of the bearing load, bearing speed, bearing lubricant type, bearing lubricant quantity, and an operational environment of the bearing. Accordingly, a temperature of outer race 66 can be utilized as an indicator of load changes for any high DN ball bearing, such as, but not limited to thrust bearing assembly 60, wherein D is defined as a diameter of the bearing bore in millimeters, and N is defined as the top speed of the bearing in revolutions per minute. Moreover, the relative changes in the temperature of outer race 66 at both first side 132 and second side 134 is utilized to determine thrust bearing assembly 60 load directions, and the cross-over occurrences to facilitate assessing potential skid damage of thrust bearing assembly 60.

In the exemplary embodiment, the algorithm utilizes a parameter indicative of total heat generated from thrust bearing 60 including, but not limited to, bearing 60 viscous friction heat, bearing 60 spinning friction heat, and bearing 60 load friction heat. Accordingly, the presence of rough micro-spalled surfaces on thrust bearing 60 increases the frictional torque and thus a related temperature of thrust bearing 60 thereby indicating a temperature steeper slope of outer race 66 as a function of operating time. Moreover, spall progression also may result in a relatively rapid rise in the temperature of outer race 66. Accordingly, the temperature of outer race 66 is input into computer 88 and compared to known operational temperatures to facilitate predicting a failure of thrust bearing 60. Moreover, and in the exemplary embodiment, the algorithm facilitates quantifying bearing damage, bearing damage propagation, and/or the resulting bearing load and direction by receiving inputs indicative of bearing geometry, a bearing lubricant quantity, bearing lubricant characteristics, bearing race speed (RPM), measured bearing temperature changes (ΔT), and bearing acoustic emissions, both magnitude and frequency on both sides of the bearing.

During engine operation, acoustic emission sensors/microphones 102 that are coupled to outer race 66 to facilitate "listening" to either cracks or spalls initiating and/or propagating in bearing assembly 60. More specifically, during normal operation, bearing assembly 60 emits an acoustic signal at a first frequency, hereinafter called the baseline frequency. Acoustic emission sensors/microphones 102 therefore facilitate sensing the baseline frequency which is then stored in a computer, such as computer 88 for example. In operation, interaction of damaged contact surfaces within bearing assembly 60 result in a transient elastic stress wave that is generated by a rapid release of energy within bearing assembly 60 material. These relatively high frequency acoustic emission signals are then received by acoustic emission sensors/microphones 102 and compared to the baseline acoustic signals to predict a failure of bearing assembly 60.

Moreover, during engine operation acoustic emission sensors/microphones 102 facilitate determining a load direction and a quality of the lubricant film supplied to bearing assembly 60. For example, a signal received from at least one acoustic emission sensors/microphone 102 from bearing assembly 60 that is weaker than the baseline signal, may be indicative of an increased load on a portion of bearing assembly 60. Moreover, since bearing assembly 60 includes a plurality of acoustic emission sensors/microphone 102, uniformity of signal strengths circumferentially on either side of the bearing can be used to indicate bearing misalignment and/or non-uniform bearing load distribution.

The bearing sensors described herein facilitate predicting damage to a thrust bearing before significant damage occurs. Moreover, the sensor assemblies also facilitate determining current damage to the thrust bearing and then predicting damage progression to the bearing such as pitting, peeling, indentation, or smearing. The sensor assembly described herein is effective in determining when the lubricant film between the ball and the damaged raceway creating a metal-to-metal contact since the acoustic signature of the bearing is different than the baseline signature. Moreover, an acoustic emission sensitivity of the sensor assembly improves with further breakdown of lubricant film while rolling elements pass over the increasingly propagating spalled area.

The above-described sensor assemblies are cost-effective and highly reliable. The sensor assemblies each include at least one acoustic emission sensor and at least two temperature sensors coupled to the bearing outer race. The sensor assemblies facilitate detecting the initial bearing flaws and/or defects that may result in bearing spalling, monitoring bearing damage and/or spall propagation, and/or assessing the overall bearing damage including multi-spall initiations and progression. As a result, the sensor assemblies facilitate reducing In Flight Shut Downs and/or Unscheduled Engine Removals.

Information received from both the acoustic sensor and the temperature sensors are utilized approximately simultaneously to facilitate monitoring the thrust bearing. More specifically, the information provided by both the acoustic and temperature sensors are complimentary to each other, and therefore facilitate providing a relatively complete indication of the thrust bearing operation that can be utilized for estimating or quantifying bearing damage propagation. The temperature data facilitates estimating and monitoring the bearing resultant load. For example, any sudden change in the bearing load and/or its expected direction may indicate a thrust load balance and the system components affecting this. Whereas changes in acoustic emissions from the thrust bearing may be indicative of the presence of initial spall or bearing damage, however small, which can then be monitored for future damage progression. The combined data for the temperature and acoustic emission changes collected from both sides of the outer race can therefore be utilized to monitor the normal bearing performance, resultant bearing load changes, a presence of debris or an initial damage to bearing that may be caused by a plurality of factors, and the damage propagation in the bearing.

Exemplary embodiments of bearing sensor assemblies are described above in detail. The sensor assemblies are not limited to the specific embodiments described herein, but rather, components of each sensor assembly may be utilized independently and separately from other components described herein. Each sensor assembly can also be used in combination with a wide variety of bearings.

While the invention has been described in terms of various specific embodiments, those skilled in the art will recognize that the invention can be practiced with modification within the spirit and scope of the claims.

What is claimed is:

1. A bearing assembly for a rotor, said bearing assembly comprising:
   an inner race;
   an outer race;
   a plurality of rolling elements positioned between said inner and outer race; and at least three sensor assemblies coupled to a first side of said outer race, and at least three sensor assemblies coupled to an opposite second side of said outer race such that said sensor assemblies are approximately-equally spaced about an outer periphery of said outer race first and second sides, each of said sensor assemblies comprising at least one temperature sensor and at least one acoustic sensor.

2. A bearing assembly in accordance with claim 1 wherein said bearing assembly comprises a high DN ball bearing, wherein D is a bearing diameter, and N is a bearing operational speed in revolutions per minute.

3. A bearing assembly in accordance with claim 1 wherein said bearing assembly comprises a thrust bearing.

4. A bearing assembly in accordance with claim 1 wherein said temperature sensors are each configured to output a signal that is utilized to determine a thrust bearing load direction.

5. A bearing assembly in accordance with claim 1 wherein said sensor assembly is configured to output a signal that is utilized to determine at least one of a bearing load, a bearing speed, a bearing lubricant type, a bearing lubricant quantity, and a bearing temperature.

6. A bearing assembly in accordance with claim 1 wherein said sensor assembly is configured to output a signal that is utilized to determine at least one of a bearing misalignment and a non-uniform bearing load distribution.

7. A gas turbine engine comprising:
a rotor shaft; and
a bearing assembly configured to support said rotor shaft, said bearing assembly comprising:
an inner race;
an outer race;
a plurality of rolling elements positioned between said inner and outer race; and
a plurality of sensor assemblies coupled to said outer race, each said sensor assembly comprising at least one temperature sensor and at least one acoustic sensor, wherein said at least one temperature sensor comprises at least one of a thermocouple and a resistance temperature detector (RTD).

8. A gas turbine engine in accordance with claim 7 wherein said bearing assembly comprises a high DN thrust bearing, wherein D is a bearing diameter, and N is a bearing operational speed in revolutions per minute.

9. A gas turbine engine in accordance with claim 7 wherein said bearing assembly further comprises at least sensor assemblies coupled to a outer race first side, and at least three sensor assemblies coupled to an opposite outer race second side such that said sensor assemblies are approximately equally spaced about an outer periphery of said outer race first and second sides.

10. A gas turbine engine in accordance with claim 7, wherein said bearing assembly comprises a thrust bearing, and said temperature sensors are each configured to output a signal that is utilized to determine a thrust bearing load direction.

11. A gas turbine engine in accordance with claim 7, wherein said bearing assembly comprises a thrust bearing, and said sensor assemblies are each configured to output a signal that is utilized to determine at least one of a bearing load, a bearing speed, a bearing lubricant type, a bearing lubricant quantity, and a bearing temperature.

12. A gas turbine engine in accordance with claim 7 wherein said sensor assemblies are each configured to output a signal that is utilized to determine at least one of a bearing misalignment and a non-uniform bearing load distribution.

* * * * *